United States Patent Office 2,766,242
Patented Oct. 9, 1956

2,766,242

CHEMICAL COMPOUNDS AND PROCESS FOR PREPARING THE SAME

John W. Richter, Fanwood, N. J., assignor to Merck & Co., Inc., Rahway, N. J., a corporation of New Jersey No Drawing. Application June 18, 1953,
Serial No. 362,665

8 Claims. (Cl. 260—251.5)

This invention relates to the production of substituted pteridines. More particularly, it is concerned with novel processes for the production of pteroic acid and amino acid derivatives thereof such as pteroyl-glutamic acid (folic acid), and novel intermediates useful in such processes.

The synthetic production of pteroic acid and amino acid derivatives thereof has become increasingly important since pteroylglutamic acid was found to be therapeutically effective in the treatment of macrocytic anemias, sprue, and other conditions of the circulatory system. However, the methods used are not entirely satisfactory because of the complicated processes often necessary to produce the desired products. In addition, such processes utilize expensive reactants and are generally characterized by overall low yields of the synthesized substituted pteridines.

Therefore, it is an object of the present invention to provide novel processes for the production of pteroic acid and amino acid derivatives thereof. Another object is to provide a process for the production of pteroylglutamic acid which utilizes readily available starting materials. A further object is to provide novel intermediate compounds which are useful in these processes.

According to a preferred embodiment of the present invention, these and other objects apparent from the following detailed description are attained by the production of pteroic acid, esters and amino derivatives thereof, by the process which comprises reacting an alkali metal salt of nitromalondialdehyde (I) with p-aminobenzoic acid, or an ester or amino derivative thereof (II), to produce the corresponding p-(3-hydroxy-2-nitroallylimino) benzoic acid, ester or amide (III) and reacting said compounds with a 2,4,5-triamino pyrimidine substituted in the 6-position with a hydroxy group, or group convertible to hydroxy (IV), in the presence of a reducing agent to produce the corresponding pteroic acid, esters or amides thereof (V). This process may be conveniently illustrated as follows:

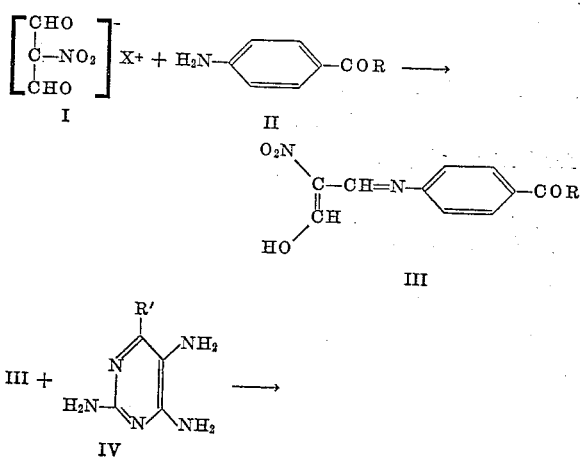

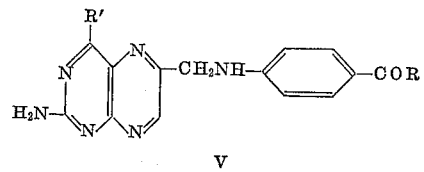

wherein X represents an alkali metal, R represents a hydroxy, alkoxy, aryloxy, aralkoxy, amino or substituted amino radical, and R' represents a hydroxy, alkoxy, aryloxy or aralkoxy radical.

With particular regard to the first step in this process an alkali metal salt of nitromalondialdehyde may be conveniently reacted with either p-aminobenzoic acid or an ester or amino derivative thereof under acidic conditions. This reaction is preferably effected by combining approximately equimolar quantities of the reactants, or an excess of the nitromalondialdehyde, in the presence of a suitable solvent under substantially acidic conditions. The desired acidification may be achieved with any suitable acid, some of which are hydrochloric acid, hydrobromic acid, sulfuric acid, phosphoric acid, acetic acid, formic acid and the like. Water is a particularly satisfactory solvent in which to effect the reaction although solvents such as the lower alcohols, acetic acid, formic acid and glycols may also be used. The reaction goes to completion in a short time at ordinary temperatures to form a reaction mixture from which the desired p-(3-hydroxy-2-nitroallylimino) benzoic acid, ester or amide may be isolated by conventional methods.

The described reaction may be readily effected with p-aminobenzoic acid or closely related derivatives thereof, such as esters like the methyl, ethyl, phenyl and benzyl esters and amides, especially amino acid amides derived from glutamic acid, glycine, aspartic acid, leucine, alanine, cysteine and the like.

The 2,4,5-triamino-pyrimidines used in this reaction may have a hydroxy group or group convertible to hydroxy by hydrolysis such as an alkoxy radical like methoxy, ethoxy or butoxy, an aryloxy radical such as phenoxy or an aralkoxy radical such as benzyloxy in the 6-position of the pyrimidine nucleus.

In a specific illustration of the described reaction an alkali metal salt of nitromalondialdehyde may be reacted with p-aminobenzoic acid to produce p-(3-hydroxy-2-nitroallylimino) benzoic acid. In a like manner, by using the appropriate p-aminobenzoic acid derivative other novel compounds such as N-[p-(3-hydroxy-2-nitroallylimino) benzoyl] glutamic acid, N-[p-3-hydroxy-2-nitroallylimino) benzoyl] alanine, N-[p-(3-hydroxy-2-nitroallylimino) benzoyl] glycine and the like may also be prepared.

In the next step of this process a p-(3-hydroxy-2-nitriallylimino) benzoic acid, ester or amide prepared as described above is reacted with a 2,4,5-triamino pyrimidine substituted in the 6-position with a hydroxy group, or group convertible to hydroxy by hydrolysis, under conditions which favor reduction to prepare the corresponding pteroic acid, ester or amide thereof. This reaction may be readily effected by contacting the reactants in a suitable solvent in the presence of a reducing agent. Solvents such as the lower carboxylic acids, lower alcohols, glycols and the like may be conveniently used for this purpose. Although a wide variety of reducing agents are satisfactory, it is preferred to employ mild reducing agents such as zinc powder in the presence of a lower carboxylic acid such as acetic acid, iron powder in acetic acid, sodium bisulfite or sodium hydrosulfite. The reduction may also be effected by catalytic hydrogenation using hydrogen with such catalysts as platinum or palladium on charcoal. This reaction proceeds at ordinary temperatures but may be promoted by the use of elevated temperatures up to about 150° C. After the reaction has been completed, which usually requires no more than one to two hours, a mild oxidizing agent is preferably added to the reaction mixture before isolation of the desired product. This is done to remove highly colored impurities and to convert any dihydropteridines which may have formed to the completely unsaturated pteridines. The product may then be isolated from the reaction mixture according to any of the conventional separation procedures used in the pteridine art.

By following this procedure pteroic acid may be prepared by reacting p-(3-hydroxy-2-nitroallylimino) benzoic acid, or an ester thereof, with a 2,4,5-triamino pyrimidine having in the 6-position a hydroxy group, or a group convertible to hydroxy, in the presence of a suitable solvent and reducing agent. In those cases where an ester is used as a reactant the resulting product can be readily converted to the free acid by alkaline hydrolysis followed by acidification of the resulting salt. In addition, any pyrimidines used as reactants which have substituents present in the 6-position that are convertible to hydroxy by hydrolysis may be hydrolyzed to this group by the action of a hydrohalic acid.

In addition to pteroic acid, other useful pteridines may be conveniently produced according to the described procedure. Thus, pteroylglutamic acid is formed by reacting N - [p - (3 - hydroxy-2-nitroallylimino)benzoyl] glutamic acid with a 2,4,5-triamino pyrimidine having in the 6-position a hydroxy group, or a group convertible to hydroxy. Other similar amides, in addition to pteroylglutamic acid, may be produced in this manner, some of which are the amides of alanine, glycine, aspartic acid, leucine and cysteine with pteroic acid.

Pursuant to an additional embodiment of the present invention pteroic acid, esters and amides thereof, such as pteroylglutamic acid, may be produced by reacting an alkali metal salt of nitromalondialdehyde (I) with at least two molar equivalents of p-aminobenzoic acid, or an ester or amino derivative thereof (II), to produce the corresponding 1,3-diimino-2-nitropropyl-N',N''-p-dibenzoic acid, ester or amide (VI) and subsequently reacting this compound with a 2,4,5-triamino pyrimidine having in the 6-position a hydroxy group, or a group convertible to hydroxy (IV), under reducing conditions to form the desired pteroic acid or corresponding derivatives (V). This sequence of reactions may be illustrated as follows:

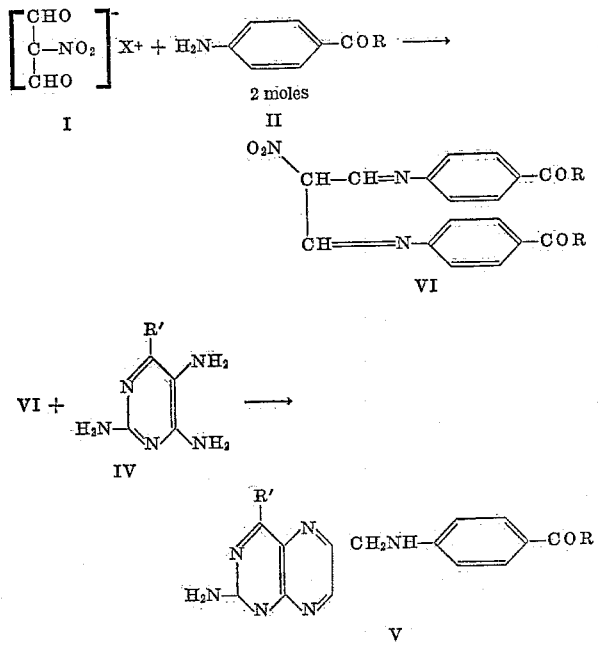

wherein X represents an alkali metal, R represents a hydroxy, alkoxy, aryloxy, aralkoxy, amino or substituted amino radical, and R' represents a hydroxy, alkoxy, aryloxy or aralkoxy radical.

With regard to this alternative process, the reaction of an alkali metal nitromalondialdehyde with two equivalents of p-aminobenzoic acid or a derivative thereof may be conveniently effected in a suitable solvent under neutral conditions. Solvents such as water and lower alcohols such as methanol and ethanol are suitable reaction mediums in which to effect the reaction. The reaction is conducted in the absence of acid so as to promote the formation of the desired diimino product in preference to the monoimino previously described. The reaction proceeds readily at ordinary temperatures and is completed soon after the reactants are combined. In addition, when solvents such as water or the lower alcohols are used the product precipitates from solution immediately and may be recovered by filtration or other suitable means.

According to a specific illustration of this process an alkali metal nitromalondialdehyde is reacted with at least two equivalents of p-aminobenzoic acid to produce 1,3-diimino-2-nitropropyl-N',N''-p-dibenzoic acid. When N-(p-aminobenzoyl) glutamic acid is substituted for p-aminobenzoic acid in this reaction, there is produced 1,3-diimino - 2 - nitropropyl - N',N''-bis-[p-benzoylglutamic acid]. Other similar compounds produced in this way from the appropriate reactants are 1,3-diimino-2-nitropropyl-N',N''-bis-[p-benzoylalanine], 1,3-diimino-2-nitropropyl-N',N''-bis-[p-benzoylcysteine] and the like.

The diimino compounds produced above may be conveniently reacted with 2,4,5-triamino-pyrimidines having a hydroxy group, or a group convertible to hydroxy, in the 6-position to form pteroic acid, and esters and amides thereof, according to the procedures previously described for reacting a p-[3-hydroxy-2-nitroallylimino] benzoic acid or derivative thereof with the described pyrimidines. However, when effecting this reaction using the diimino compounds it is preferred to have present in the reaction medium a small amount of a suitable acid or acidic substance to aid formation of the desired product. Ordinarily, sufficient acid is present in the reaction mixture when the reduction is achieved with zinc or iron in the presence of a lower carboxylic acid. In other cases, such as catalytic hydrogenation, a small amount of acid may be added.

In a specific illustration of this reaction employing a diimino compound as a reactant, 1,3-diimino-2-nitropropyl-N',N''-bis-[p-benzoylglutamic acid] may be reacted with 6-hydroxy-2,4,5-triamino pyrimidine to produce pteroylglutamic acid. In a like manner, pteroic acid is obtained by reacting 6-hydroxy-2,4,5-triamino pyrimidine with 1,3-diimino-2-nitropropyl-N',N''-p-dibenzoic acid. Other similar compounds may be prepared according to this reaction by selecting the proper diimino compound.

The following examples are included to illustrate specific embodiments of this invention but are not to be construed as limiting the invention to the novel subject matter contained therein.

EXAMPLE 1

*Production of p-(3-hydroxy-2-nitroallylimino) benzoic acid*

A solution of 4.2 gm. of the sodium salt of nitromalondialdehyde in 25 ml. of water is added to a solution of 4.1 gm. of p-aminobenzoic acid in dilute hydrochloric acid. A yellow precipitate of p-(3-hydroxy-2-nitroallylimino) benzoic acid forms immediately. The product is filtered, washed with water and dried. It melts at 255° C. with decomposition.

The nitromalondialdehyde is prepared according to the procedure described by Hill and Torrey in the Am. Chem. J. 22, 95 (1899) as follows: About 40 gm. of sodium nitrite is dissolved in 100 ml. of water and to this solution is added slowly a solution of 40 gm. of mucobromic acid in 100 ml. of ethanol. The temperature is maintained at about 50° C. during the reaction by cooling. The mixture is finally maintained at 50° C. for one hour by heating. The mixture is then chilled to precipitate the sodium salt of nitromalondialdehyde which is filtered and washed with dry alcohol and ether.

EXAMPLE 2

*Production of ethyl-p-(3-hydroxy - 2 - nitroallylimino) benzoate*

To a dilute hydrochloric acid solution of 5.0 gm. of ethyl-p-aminobenzoate is added 4.2 gm. of the sodium salt of nitromalondialdehyde. A yellow crystalline product appears which is filtered and recrystallized from ethanol. The purified ethyl-p-(3-hydroxy-2-nitroallylimino) benzoate melts at 151–152° C.

EXAMPLE 3

*Production of N-[p-(3-hydroxy-2-nitroallylimino) benzoyl] glutamic acid*

To a mixture of 25 ml. of glacial acetic acid and 100 ml. of water is added 4.2 gm. of the sodium salt of nitromalondialdehyde followed by the addition of 8 gm. of N-(p-aminobenzoyl) glutamic acid. The reaction mixture is cooled, water added and the N-[p-(3-hydroxy-2-nitroallylimino) benzoyl] glutamic acid recovered by filtration. It is washed with alcohol and dried.

EXAMPLE 4

*Production of pteroic acid*

A mixture of 2.36 gm. of p-(3-hydroxy-2-nitroallylimino) benzoic acid, 2.0 gm. of zinc dust, 2.2 gm. of 2,4,5-triamino-6-hydroxy-pyrimidine sulfite and 3.0 gm. of sodium acetate is added to a mixture of 15 ml. of glacial acetic acid and 30 ml. of ethylene glycol. The mixture is heated at 50° C. for one-half hour and then raised to 120° C. for another one-half hour. The mixture is then poured into water to precipitate pteroic acid. The product is dissolved in dilute sodium hydroxide and treated with 0.6 gm. of potassium permanganate in 100 ml. of water. The mixture is filtered, acidified with dilute hydrochloric acid and the precipitate collected. It is washed with water, alcohol and ether. The product displays pteroic acid activity when assayed with *S. fecalis* R.

EXAMPLE 5

*Production of pteroylglutamic acid*

About 4.3 gm. of N-[p-(3-hydroxy-2-nitroallylimino) benzoyl] glutamic acid, 2.0 gm. of zinc dust, 2.0 gm. of 2,4,5-triamino-6-hydroxy-pyrimidine sulfite and 3.0 gm. of sodium acetate are added to a mixture of 15 ml. of glacial acetic acid and 30 ml. of ethylene glycol. The mixture is heated at 120° C. for a half hour and poured into 300 ml. of water. The precipitate is filtered and washed with water and ether. This product displays folic acid activity on biological assay.

EXAMPLE 6

*Production of ethyl-1,3-diimino-2-nitropropyl-N',N''-p-dibenzoate*

An aqueous solution containing 4.2 gm. of the sodium salt of nitromalondialdehyde is added to an aqueous solution of 10.0 gm. of ethyl-p-aminobenzoate. Long, bright yellow needles of ethyl-1,3-diimino-2-nitropropyl-N',N''-p-dibenzoate precipitate very quickly and are recovered by filtration. After recrystallization from ethanol the product melts at 212–214° C.

EXAMPLE 7

*Production of pteroic acid*

About 12.3 gm. of ethyl-1,3-diimino-2-nitropropyl-N',N''-p-dibenzoate, 4.3 gm. of 2,4,5-triamino-6-hydroxy-pyrimidine and 4.4 gm. of zinc dust is added to a mixture of 150 ml. of alcohol and 50 ml. of water. The resulting mixture is stirred at 40° C. while 30 ml. of acetic acid is added slowly during one-half hour. The mixture is heated to 70° C. with stirring and kept at this temperature for one hour. The mixture is diluted with 200 ml. of water, made basic with sodium hydroxide, treated with activated charcoal and filtered. The filtrate is acidified to pH 2.0 with dilute hydrochloric acid, the precipitate collected and washed with water, acetone and ether. The product is dissolved in 0.1 N sodium hydroxide and a small amount of mercuric oxide added. After filtering, the filtrate is acidified with hydrochloric acid to precipitate pteroic acid which is collected by filtration and washed with acetone. The product has typical pteroic acid activity when assayed with *S. fecalis* R.

What is claimed is:

1. The process which comprises reacting a compound having the formula

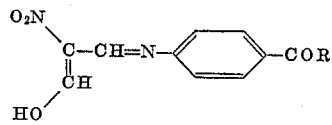

with a pyrimidine having the formula

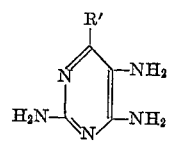

in the presence of a reducing agent to produce a compound having the formula

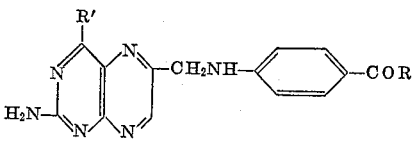

wherein, in each occurrence, R represents a member of the group consisting of hydroxy, lower alkoxy and the radical

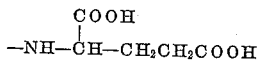

and R' represents a hydroxyl radical.

2. The process which comprises reacting p-(3-hydroxy-2-nitroallylimino) benzoic acid with 2,4,5-triamino-6-hydroxy pyrimidine in the presence of a reducing agent to produce pteroic acid.

3. The process which comprises reacting N-[p-(3-hydroxy-2-nitroallylimino) benzoyl] glutamic acid with 2,4,5-triamino-6-hydroxy pyrimidine in the presence of a reducing agent to produce pteroylglutamic acid.

4. The process which comprises reacting a compound having the formula

with an alkali metal salt of nitromalondialdehyde in the presence of an acid to produce a compound having the formula

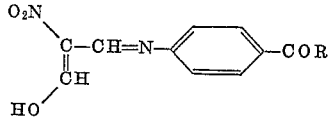

and reacting said compound with a pyrimidine having the formula

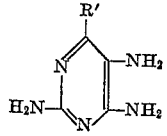

in the presence of a reducing agent to produce a compound having the formula

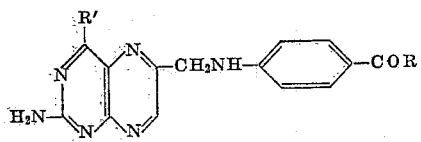

wherein, in each occurrence, R represents a member of the group consisting of hydroxy, lower alkoxy and the radical

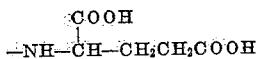

and R' represents a hydroxyl radical.

5. The process which comprises reacting p-amino-benzoic acid with an alkali metal salt of nitromalondialdehyde in the presence of an acid to produce p-(3-hydroxy-2-nitroallylimino) benzoic acid and reacting said compound with 2,4,5-triamino-6-hydroxy pyrimidine in the presence of a reducing agent to produce pteroic acid.

6. The process which comprises reacting N-(p-aminobenzoyl) glutamic acid with an alkali metal salt of nitromalondialdehyde in the presence of an acid to produce N-[p-(3-hydroxy-2-nitroallylimino)benzoyl]glutamic acid and reacting said compound with 2,4,5-triamino-6-hydroxy pyrimidine in the presence of a reducing agent to produce pteroylglutamic acid.

7. The process which comprises reacting a compound having the formula

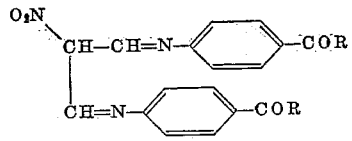

with a compound having the formula

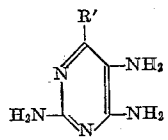

in the presence of a reducing agent to produce a compound having the formula

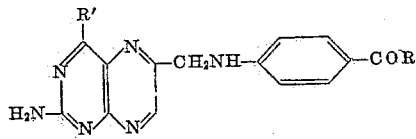

wherein, in each occurrence, R represents a member of the group consisting of hydroxy, lower alkoxy and the radical

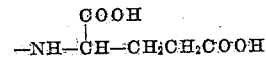

and R' represents a hydroxyl radical.

8. The process which comprises reacting approximately one molar equivalent of an alkali metal salt of nitromalondialdehyde with at least two molar equivalents of a compound having the formula

under neutral conditions to produce a compound having the formula

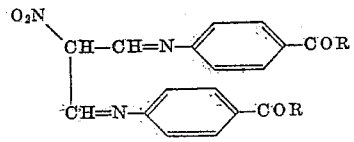

and reacting said compound with a pyrimidine having the formula

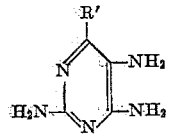

in the presence of a reducing agent to produce a compound having the formula

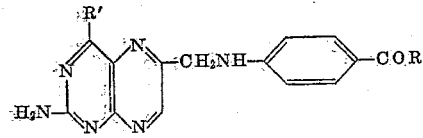

wherein, in each occurrence, R represents a member of the group consisting of hydroxy, lower alkoxy and the radical

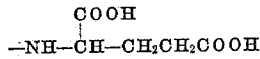

and R' represents a hydroxyl radical.

References Cited in the file of this patent
UNITED STATES PATENTS

| | | |
|---|---|---|
| 2,487,393 | Spiegelberg | Nov. 8, 1949 |
| 2,518,525 | Curtis | Aug. 15, 1950 |
| 2,545,305 | O'Dell | Mar. 13, 1951 |
| 2,561,468 | Guest | July 24, 1951 |